Patented Mar. 28, 1950

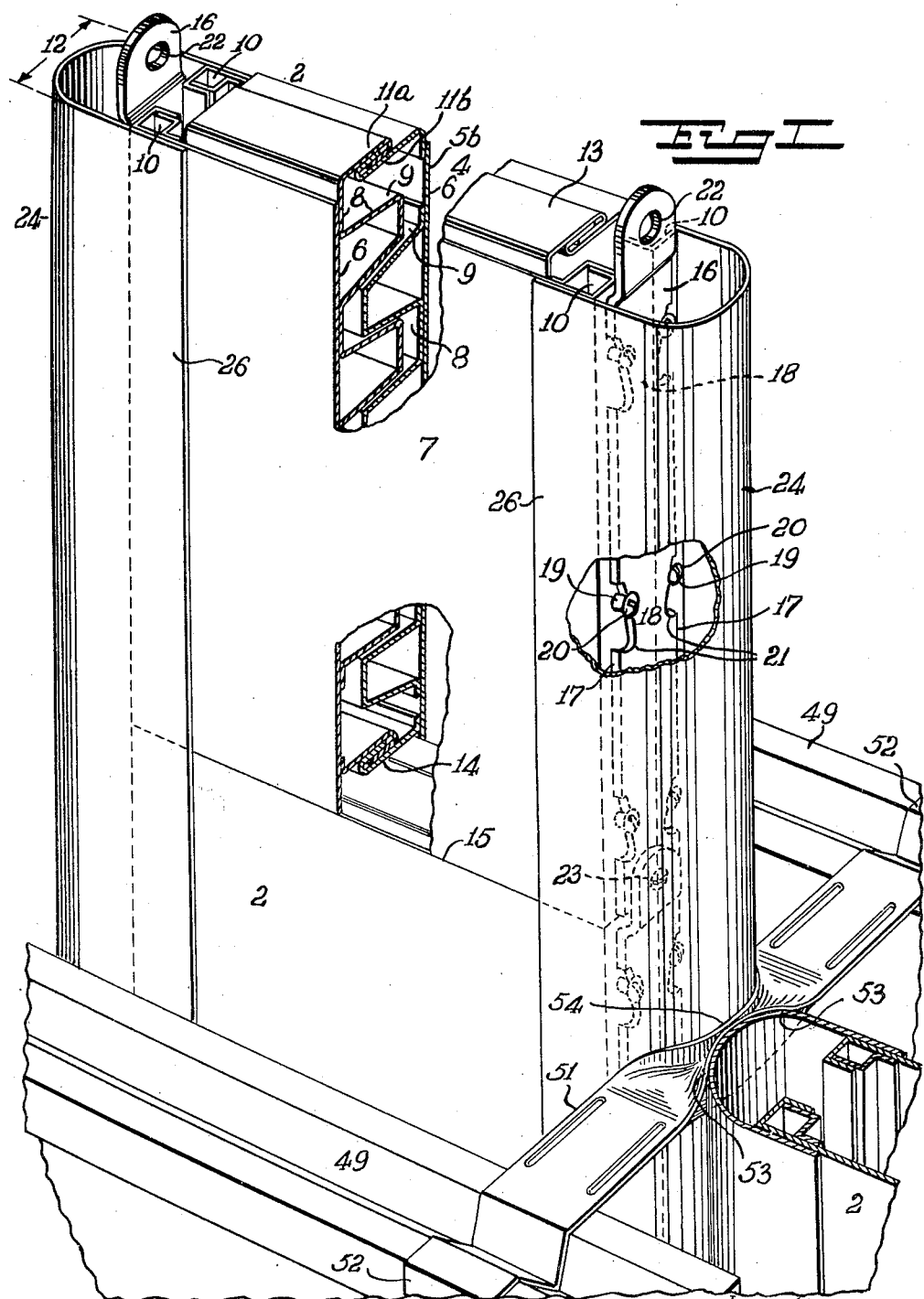

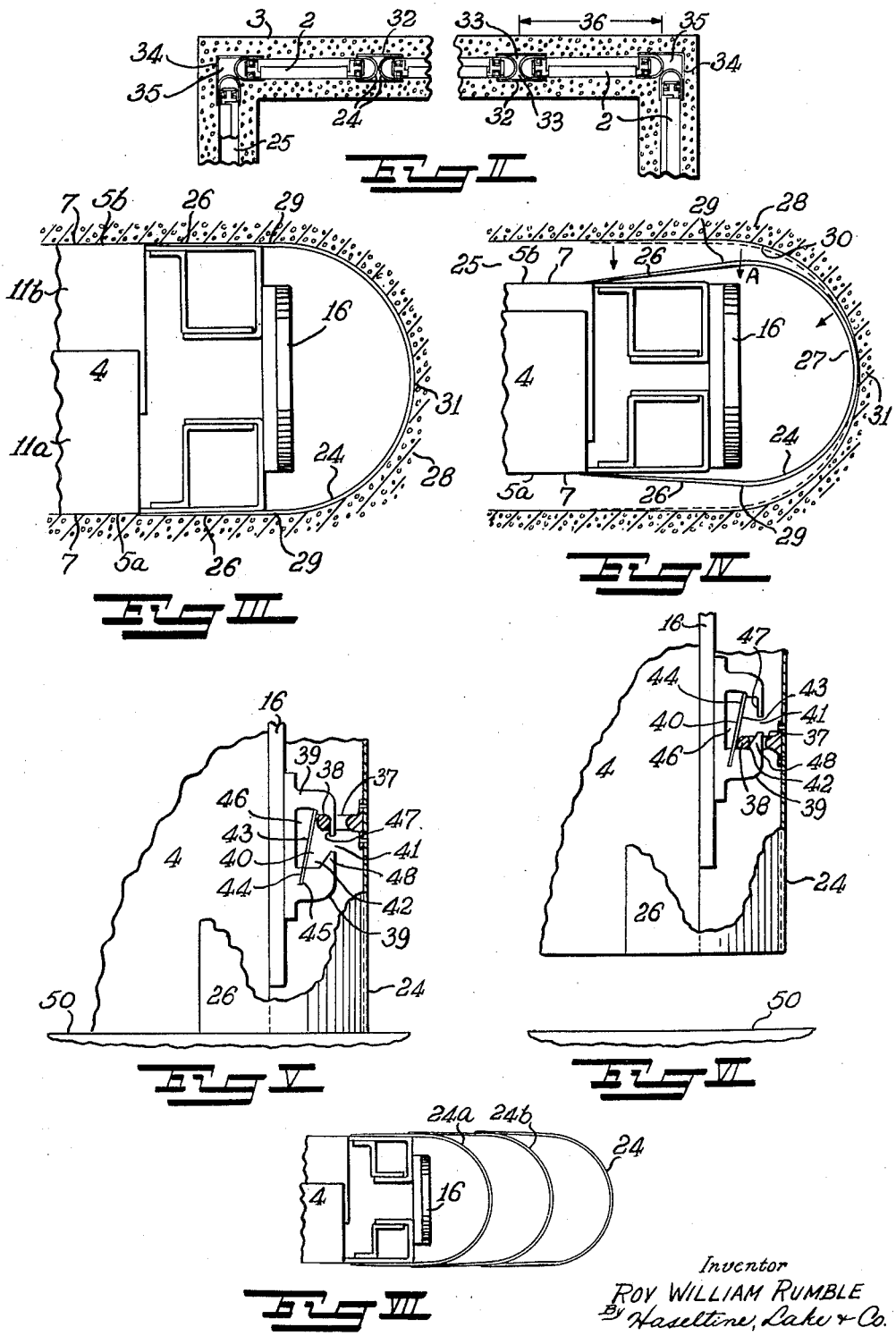

2,501,877

UNITED STATES PATENT OFFICE 2,501,877

CORE SHUTTERING SUITABLE FOR MOLDING HOLLOW WALLS

Roy William Rumble, Pretoria, Transvaal, Union of South Africa

Application May 21, 1945, Serial No. 595,035
In the Union of South Africa June 8, 1944

2 Claims. (Cl. 25—128)

This invention relates to re-usable core shuttering suitable for coring the cavity of hollow walls made of concrete or like material that is moulded in place. Such core shuttering requires to be rigid enough to withstand the pressure of the concrete mix whilst being collapsible to enable it to be withdrawn from the cored cavity.

When the cross sectional dimensions of a cavity that is to be cored in concrete are not very different from one another, there is no great difficulty in providing or devising a core that collapses to a substantial extent in both such dimensions whilst remaining a unitary structure ready for re-use upon being re-expanded to its moulding form. Usually the rigid elements of core structure of this kind are so pivotally connected as to have relative angular movements whereby the corner portions are withdrawn within the outline of the expanded core. This kind of core structure however is inapplicable to the long and thin cross section of the cavity of a cavity wall; which moreover is often deep in the sense of being of considerable magnitude in the dimension perpendicular to the cross section. As far as collapse in the thickness dimension is concerned the problem is easily met by core shuttering comprising two face members assembled back to back and each providing an outwardly directed moulding face against which the inwardly opposite faces of the concrete are moulded; means being provided between said face members to move them towards and from one another, and thereby vary the thickness dimension of the shuttering. The difficulty remains of devising an adjustment that enables the ends of the shuttering to be freed from the ends of the moulded cavity.

According to this invention, core shuttering that is long and thin in cross section comprises one or more edge members that constitute the moulding edge or edges at the end or ends of the shuttering in the length dimension and each edge member being of resiliently flexible sheet material and having two arms overlapping and frictionally engaging the respective moulding faces towards the edges of the latter, and being so shaped that the arms are pressed apart resiliently by the body and spring towards one another as the thickness dimension of the body is diminished, the cross-sectional shape of each edge member being that of a V with an arcuate base.

That each edge member is arranged to have its thickness dimension altered in the same way as and when the thickness dimension of the body is altered, so as to be at all times of materially the same thickness as the body. The main portion or body of the core shuttering presents two opposite and outward moulding faces defining the thickness dimension; and the outward moulding face of each edge member is continuous with both said faces, that is to say its surface extends through an angle of 180°. In order that such a surface may part readily from concrete moulded against it, it is important that the collapsing movement of such surface should be without material tangential sliding movement relatively to the concrete surface; and accordingly, the moulding surfaces of the core, including the surfaces of the body and of the edge members, are adapted to collapse in directions including direction components perpendicular to said surfaces.

This effect is attained in the case of the edge members by making them of resiliently flexible sheet material, shaped to bend away from concrete moulded against it, upon the thickness dimension being altered. Said flexible sheet material is biased to collapse to a shape smaller than its expanded shape. In addition the edge members are preferably made to be adjustable bodily away from the concrete, while the core is in the moulded cavity and preferably after the thickness dimension of the core has been collapsed. In respect of each edge member the arms of the U are associated respectively with the above mentioned face members of the body. Said arms of the U may be biased to spring towards one another and be simply clamped frictionally over the edge portions of the body when the latter consists of the face members adapted to be adjusted towards and from one another.

The edge members may be separable from the core body in a way that enables the body to be withdrawn from the core cavity before the end members; or the edge members may be positively attached to the body. In the latter case mechanism may be provided for projecting or retracting the edge members as the body is expanded or contracted in the thickness dimension.

The invention further consists in core shuttering in which the body consists of two face members adjustable towards and from one another each comprising a thin flat sheet providing a moulding face, and a corrugated sheet united to the flat sheet at the ridges of the corrugations, said corrugations all being parallel with one superficial dimension of the body and each such member comprising a stiffening formation at each end extending at right angles to said corrugation.

The invention further includes core shuttering constructed for expansion and contraction in thickness and formed as panels each comprising formations, such as a spigot and a socket, for endwise connection with similar panels.

When such panels are provided with means actuated from the ends of the panel for controlling the adjustment in thickness, said means are made connectible with the similar means of a similar panel to control the thickness dimension of connected panels simultaneously.

Examples of the invention are shown in the accompanying drawings in which—

Figure I is a perspective view of the core shuttering,

Figure II is a horizontal section through a cored wall, with the core shuttering in position, Figure III is an enlarged horizontal section showing the end of the shuttering in the cored cavity and expanded, Figure IV is similar to Figure II but shows the shuttering contracted, Figure V is a vertical section showing a connection between the body of the shuttering and an end member, Figure VI shows the same with the parts in a different position, Figure VII is a horizontal section of one end of the core shuttering fitted with a number of end members.

Figures I and II show the shuttering in the position for coring the cavity of a cavity wall. They also show the shuttering constructed of separate units 2 or panels adapted to be used singly or in association with one another. Each such unit is long in the horizontal direction parallel with the length of the wall 3; and thin in the direction of the thickness of said wall. Each unit comprises a body 4 which in the example comprises the two face members 5a, 5b, each formed of a thin sheet 6 providing the moulding face 7 and stiffened by light-weight thickness structure welded to its back and consisting of a sheet 8 bent to form a set of parallel ribs 9. The ribs of the respective members are welded to the sheet 6. The two sets interdigitate with one another in a manner that permits the members 5a, 5b, to move towards and from one another to vary the thickness dimension of the body. The ribs provide stiffness in the one superficial dimension, here shown as the horizontal dimension; and edge portions 10 of the sheets 6 bent over to form a box section, provide stiffness in the other superficial dimension.

The interior of the body is closed in above and below by bending the material of each ribbed sheet 8 inward at right angles and folding its edge 11a to interengage with the similarly folded edge of the other member 11b of 5b; said engagement leaving the members 5a, 5b, free to move relatively to one another in the thickness dimension 12. The upper one 13 of these closed-in formations is positioned to project above the sheets 6; and at the other end of the vertical length of the body the similar formation 14 is positioned above the corresponding end 15 of the sheets 6. In this way the body is provided with spigot and socket ends which enable a series of panels to be engaged end to end, and with their facing sheets 6 meeting at the level edge 15 and thereby providing a continuous moulding face.

The means for expanding and contracting the body in its thickness dimension comprises the wedge bars 16 associated with the vertical edges of the body. Said bars are of flat strip with their edges 17 cut in at intervals to provide the series of wedges 18 tapered vertically downward. Said wedges 18 lie between pairs of pins 19 projecting from the edges 10 of the body members 5a, 5b respectively, and the heads 20 of which retain the bars 16 in position next to said edges 10. Accordingly by pushing down the bars 16, the shuttering is expanded in thickness preparatory to the concrete being poured. Upon the bars 16 being pulled up, the units are free to collapse towards one another and away from the concrete that has been moulded against them. By continuing the pulling up, hooks 21 at the smaller ends of the wedges 18 engage under the pins 19, and, through the latter, pull the shuttering bodily out of the cavity.

Holes 22 formed at the ends of the bars 16 serve for the engagement of a pulling device; and also for receiving bolts 23 that connect together the wedge bars 16 of a series of panels that are connected endwise as by the spigot and socket formations described. Such connection of the wedge bars enables all the panels that are connected endwise, to be expanded or contracted simultaneously.

The moulding edges of the panel are provided by the edge members 24, which, in Figures I to IV are shown as being separable from the body 4 and held thereto frictionally. There may be a pair of edge members for each panel; or as shown one pair of edge members, as long as the cavity 25 is deep, may be associated with a series of panels connected endwise. Said edge members 24 are made of sheet material having a useful degree of elasticity when bent; mild steel sheet being suitable. They are of general U form comprising the two arms 26 (Fig. IV) and the arcuate portion 27 connecting said arms. Their unstressed form is similar to that shown in Figure IV, where the arcuate portion 27 is of rather more than 180° angular extent and the arms 26 are consequently inclined to one another towards their free ends. In fitting such edge members to the vertical edges of the panel body the arms 26 are sprung apart and passed over the moulding faces 7 of the body to clasp said body frictionally. The dimensions of the cross section of the edge members are so chosen that upon the body panel being subsequently expanded in thickness, the arms of the section lie flat with the moulding faces 7 and the arcuate portion 27 becomes of not more than 180° angular extent, as shown in Fig. III. The thickness of the metal of the end members is sufficiently small for the superimposition of the arm 26 on the moulding faces 7 not to add significantly to the thickness of the panel.

The concrete 28, Figures III and IV, is cast around the shuttering when both the body and the edge members are in the expanded condition (Figure III). One effect is that the pressure of the concrete on the outer surfaces of the arms 26, clamps the edge members firmly to the body 4, so holding said edge members against movement. Upon the wedge bars 16 being thereafter raised, the body panel 4 is caused or allowed to collapse in thickness, permitting the edge members resiliently to collapse to the form shown in Figure IV. The consequent increase of the curvature of the arcuate portion 27 causes the portions 29 of its wall that are of the greatest width, to be withdrawn from the formed concrete surface 30 in the direction, indicated by the arrows A, that has a material direction component perpendicular to itself and the adjacent portion of the concrete surface 30. The same holds good for the remaining extent of the curved surface 27, with the exception of its centre point 31, and detachment of the latter from the adjacent concrete surface is readily effected by bodily movement of the edge member towards the body 4. Such bodily movement is in turn rendered possible by the previous detachment or loosening of the wider portion 29 and the arms 26 from the concrete.

If it is desired to maintain wall 3 of uniform thickness throughout, means are provided to prevent concrete from entering the gaps 32 (Figure II) between the ends of the core panels 2. Said means are shown as thin flat plates 33 that span said gaps between panels 2 that are in line; and thin angle members 34 that enclose the gaps 35 at the corners of the wall.

The loose edge members shown in Figures I to IV tend to remain in the cavity 25 when the body is withdrawn therefrom; and if they do so, their upper ends are readily accessible for pulling them out of the cavity.

Figure VII shows a number of the loose end members 24 clipped one over another at the end of the body 4. The expansion or contraction of the body 4 in thickness similarly expands or contracts the end member 24a directly in contact with it; and said member 24a in turn expands or contracts the next member 24b, and so on. An assembly of end members in this way enables the effective length dimension 36 (Figure II) of the core shuttering to be adjusted.

The edge members 24 may however be secured to the body 4. An example is shown in Figures V and VI. Means may also be provided for mechanically projecting the edge members 24 and for mechanically retracting them from the concrete after the latter has set.

Eyes 37 are attached at intervals to the internal surfaces of the edge members to project towards the body 4, and a transverse pin element 38 of each eye engages in a bracket 39 extending from the wedge bar 16 towards the edge member 24. Said bracket is formed with an internal aperture 40 to which the pin 38 is admitted through a gap 41; enabling the edge member 24 to be readily attached to or detached from the body 4. When the pin 38 is in the aperture 40 and the edge member is free to be subject to gravity, the pin 38 rests in a pocket 42 (Figure VI) at the base of the aperture 40; the position of such pocket in the horizontal direction being such that the edge member is then in its retracted position relatively to the panel body.

The wall 43 of the aperture that in side elevation is nearest the body panel, is sloped upwardly and away from the panel. Said wall consists of a somewhat stiff leaf spring 44 fixed to the bracket at 45 and capable of being forced back from its normal position shown, into the space 46 provided behind it for that purpose.

The opposite wall of the aperture 40 comprises an upper vertical portion 47 (which is interrupted by the gap 41) and a lower portion 48 that slopes in the same general direction as the wall 43 but at a greater inclination to the vertical. That is to say, the slope that extends over the whole vertical extent of wall 43 is contained in the shorter vertical extent of wall portion 48.

When the core shuttering panel, with the edge members 24 attached thereto by the pin 38 seated in the pocket 42, is being lowered into position (Figure VI) between the outer shuttering walls 49 (Figure I), the wedge bars 16 are at their upper position relatively to the assembly. Upon the lower ends of the panel body 4 and of the edge members 24 coming into contact with the wall foundation 50 (Figure V), the wedge bars 16 are pressed down and expand the panel body as already described. Such pressing down of the wedge bars brings the sloping wall 43 into contact with the pin 38—now retained against downward movement—and forces said pin to the right in Figure V, thereby projecting the edge members 24 away from the body 4. The spring 44 is provided to enable said wall to yield in case the edge member meets an obstacle; as for instance as shown in Figure II, where there are several core panels arranged in a line. In that case the spring 44 permits the adjacent edge members 24, 24, to come into contact and thereafter remain without further movement while the wedge bars 16 complete their descending movement to the extent necessary to expand the thickness of the panels. Subject to such yielding, the pin 38 assumes the position in the upper part of the aperture shown in Figure V.

During the subsequent raising of the wedge bars to collapse the shuttering (Figure VI), the pin 38 may contact the vertical wall 47 of the aperture; but is not moved laterally thereby. The edge member 24 thus remains projected while its arms 26 are in process of collapsing with the panel body 4; but towards the end of that operation and when the wedge bars are reaching the upper limit of their movement relatively to the body, the inclined wall portion 48 strikes the pin 38, thrusting it to the left in Figures V and VI and thereby retracting the edge member 24.

51 (Figure I) indicates one of the cross ties described in my prior application No. 577,899, now Patent No. 2,442,962, having its ends 52 engaged with the edges of the external shuttering 49 and providing the pairs of shoulders 53 that engage the edge members 24 to hold the core shuttering in position between the external shuttering walls 49; said tie comprising a thin central portion 54 that passes between the edge members 24.

I claim:

1. Core shuttering comprising a body consisting of two face members adjustable towards and from one another, each face member comprising a thin flat sheet providing a moulding face and a corrugated sheet united to the flat sheet at the ridges of the corrugations, the corrugations all being parallel with one superficial dimension of the body and each such member comprising stiffening formations extending at right angles to said corrugations, the corrugations of the respective members being interdigitated with one another, said stiffening formations being clear of said corrugations and near those ends of the body that terminate the other superficial dimension of the body; the shuttering also comprising edge members constructed of resiliently flexible sheet material approximately U-shaped in cross-section, with the arms of the U resiliently and frictionally engaged with the edge portions of the respective face members; and means movable relatively to the body for controlling expansion and contraction of the thickness dimension of the body and simultaneously controlling projection and retraction of the edge members.

2. The core shuttering claimed in claim 1, in which the corrugated sheets are bent inward at the top and bottom of the shuttering body to provide a spigot at the one end of said body and the bottom of a socket at the other end of the body, the bent portions being left free to move relatively to one another in the thickness dimension of the shuttering body.

ROY WILLIAM RUMBLE.

REFERENCES CITED

The following references are of record in the file of this patent:

UNITED STATES PATENTS

| Number | Name | Date |
| --- | --- | --- |
| 1,086,121 | Atterbury | Feb. 3, 1914 |
| 1,174,519 | Pray | Mar. 7, 1916 |
| 1,694,036 | Kuert | Dec. 4, 1928 |
| 1,996,678 | Leggat et al. | Apr. 2, 1935 |